US012594912B2

(12) United States Patent
Gschwender et al.

(10) Patent No.: US 12,594,912 B2
(45) Date of Patent: Apr. 7, 2026

(54) COMPRESSED-AIR PROVIDING SYSTEM, IN PARTICULAR FOR PROVIDING AIR FOR TIRES OF A MOTOR VEHICLE

(71) Applicant: Aircom Automotive Sp. z o.o. Sp. k., Pietrzykowice (PL)

(72) Inventors: Dominik Gschwender, Steckborn (CH); Grzegorz Batycki, Bielany Wroclawskie (PL)

(73) Assignee: aircom automotive sp. z o.o., Pietrzykowice (PL)

( * ) Notice: Subject to any disclaimer, the term of this patent is extended or adjusted under 35 U.S.C. 154(b) by 0 days.

(21) Appl. No.: 18/682,170

(22) PCT Filed: Aug. 4, 2022

(86) PCT No.: PCT/EP2022/071950
§ 371 (c)(1),
(2) Date: Feb. 8, 2024

(87) PCT Pub. No.: WO2023/020851
PCT Pub. Date: Feb. 23, 2023

(65) Prior Publication Data
US 2024/0367621 A1      Nov. 7, 2024

(30) Foreign Application Priority Data

Aug. 19, 2021    (DE) ..................... 10 2021 121 488.2

(51) Int. Cl.
*B60S 5/04*        (2006.01)
*H02J 50/12*       (2016.01)
(52) U.S. Cl.
CPC ............... *B60S 5/046* (2013.01); *H02J 50/12* (2016.02)

(58) Field of Classification Search
CPC ..... B29C 73/166; B29L 2030/00; H02J 50/10
See application file for complete search history.

(56) References Cited

U.S. PATENT DOCUMENTS 8,640,744 B2 * 2/2014 Dowel ................ F16K 17/0406
                                                      141/330
2011/0121660 A1 * 5/2011 Azancot ................ H02J 50/402
                                                      307/104
(Continued)

FOREIGN PATENT DOCUMENTS

CN        209818244 U      12/2019
CN        111997869 A      11/2020
(Continued)

OTHER PUBLICATIONS

Wikipedia: "Drahtlose Energieübertragung" dated Oct. 5, 2022 with English translation.
(Continued)

*Primary Examiner* — Timothy P. Kelly
(74) *Attorney, Agent, or Firm* — Carter, DeLuca & Farrell LLP

(57) ABSTRACT

The invention relates to a compressed-air providing system (10), in particular for providing air for tires (14) of a motor vehicle, comprising a compressor (16) having an electric motor (18), in particular for driving a compressing unit of the compressor (16), the compressed-air providing system (10) having means (22) for connecting the compressed-air providing system (10), in particular the electric motor (18), to an energy supply source (24) for the purpose of supplying the electric motor (18) with electrical energy. According to the invention, the means (22) comprises means for wireless transmission of energy.

12 Claims, 4 Drawing Sheets

(56)                    References Cited

U.S. PATENT DOCUMENTS

2018/0186197  A1     7/2018   Tsiberidis et al.
2019/0023091  A1     1/2019   Spindler et al.
2020/0070450  A1     3/2020   Tsiberidis

FOREIGN PATENT DOCUMENTS

DE      10 2017 200 625  A1     7/2018
DE      10 2018 209 846  A1     12/2019

OTHER PUBLICATIONS

International Search Report for application No. PCT/EP2022/071950 dated Nov. 21, 2022 with English Translation.
Written Opinion for application No. PCT/EP2022/071950 dated Feb. 23, 2023 with English translation.
International Preliminary Report on Patentability for PCT/EP2022/071950 dated Sep. 1, 2023 with English translation.
Examination report for DE 10 2021 121 488.2 dated May 10, 2022.

* cited by examiner

14

12

10

34

32

30

38

18

U$_s$

24

COMPRESSED-AIR PROVIDING SYSTEM, IN PARTICULAR FOR PROVIDING AIR FOR TIRES OF A MOTOR VEHICLE

The invention relates to a compressed-air providing system, in particular for providing air for tires of a motor vehicle.

Compressed-air providing systems are known from the prior art. For example, compressed-air providing systems that can be connected via a sealing liquid container to a pneumatic tire to be sealed are known. The sealing liquid container is, for example, connected to a compressor of the compressed-air providing system by an air inlet opening and connected to the tire by an outlet opening via which an air/sealing liquid mixture can exit.

The compressor, in particular a compressing unit of the compressor, is driven, for example, by an electric motor. The electric motor is usually connected via a supply connection to an on-board power socket that can be supplied with power by means of a vehicle battery, which power socket is usually used as a cigarette lighter.

This type of on-board power socket is increasingly being installed in vehicles.

The object of the present invention is to propose an alternative solution for supplying energy to the compressed-air providing system.

According to the invention, in a compressed-air providing system comprising a compressor having an electric motor, and means for connecting the compressed-air providing system, in particular the electric motor, to an energy supply source for supplying the electric motor with electrical energy, it is proposed that the means comprise means for wireless transmission of energy.

The means for connecting the compressed-air providing system, in particular the electric motor, to an energy supply source are or comprise, for example, a power receiving unit (PRU).

The electric motor is supplied with energy directly via the means for connecting the compressed-air providing system, in particular the electric motor, to the energy supply source. The electrical energy that can be transmitted is thus transmitted directly to the electric motor by the means, for example the power receiving unit. The energy is not temporarily stored in a battery.

According to the invention, the transmission of energy is thus effected not on a wired basis, but by means of inductive coupling based on the magnetic flux via electromagnetic fields.

The frequency of the electromagnetic field is, for example, in a range of 100 kHz-205 KHz.

With the system according to the invention, power in the range of greater than 50 Watts can preferably be transmitted by means of inductive coupling.

Interfaces for inductive coupling are usually installed in motor vehicles for the purpose of charging smartphones. Alternatively, such interfaces can also be retrofitted on the motor vehicle side.

The wireless transmission of energy enables convenient handling, as there is no need to establish a cable connection between the energy supply source and the terminal. The energy supply source and the terminal are also insulated against one another and can each be accommodated in completely closed housings. Furthermore, plug connections compatible with one another can be dispensed with.

According to an advantageous embodiment, it is provided that the means for wireless transmission of energy comprises a receiver coil. A transmitter coil is accordingly provided on the motor vehicle side. For the inductive transmission of energy, a magnetic alternating field is generated on the transmitter side. Transmission is effected by means of the mutual induction between the transmitter coil and receiver coil. An alternating voltage is induced in the receiver coil. The distance between the two coils represents the wireless transmission path and should be as small as possible-typically a few centimeters to a few tens of cm distance.

In order to increase the range of the inductive coupling, according to a further advantageous embodiment it can be provided that the means for wireless transmission of energy comprises at least one resonant circuit. One or more free oscillating circuits are attached between the transmitter coil and receiver coil. An oscillating circuit consists of a capacitor and a coil whose resonant frequency is matched to the transmission frequency. The resonance between the oscillating circuits leads to improved magnetic coupling between the transmitter coil and receiver coil at the transmission frequency. The oscillating circuits should have the highest possible quality factor. This results in a greater range and better efficiency. Thus, the wireless transmission of energy is possible over a distance in the order of magnitude of 4 to 10 times the coil diameter. When resonant circuits are used, the transmission of energy is effected by means of resonant, inductive coupling.

Furthermore, it can be provided that the means comprises at least one electrical circuit for coupling the electric motor to the receiver coil.

It can be advantageous that the electrical circuit comprises a converter or a rectifier, for example an AC/DC converter. For example, the induced alternating voltage can thus advantageously be adapted to an operating voltage of the electric motor.

According to an advantageous embodiment, it is provided that the means for wireless transmission of energy is integrated into a supply plate and/or a supply pad or comprises a supply plate and/or a supply pad.

Furthermore, it is provided that the means for wireless transmission of energy is arranged outside of a housing of the compressed-air providing system, which housing in particular receives the compressor and the electric motor, wherein the means can be connected or is connected via an energy supply line, in particular via a cable, to the compressor, in particular to the electric motor.

According to a further embodiment, it can be provided that the compressed-air providing system comprises a compressed-air outlet opening, wherein the compressed-air outlet opening can be connected directly or via a sealing liquid container to a pneumatic tire to be sealed and/or pumped up.

These and other features of the invention can also be found in the following description as well as in the drawings and the claims.

The invention is explained in more detail below with reference to the drawings. In the drawings.

Figure 1:
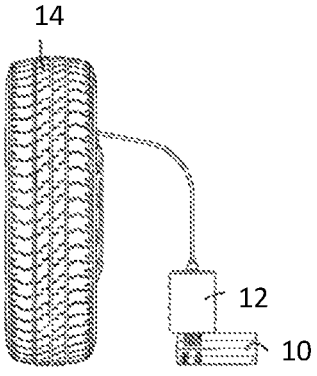
FIG. 1 shows a schematic representation of a compressed-air providing system with a sealing liquid container and a tire.

FIG. 1 shows a schematic representation of a compressed-air providing system 10, which is connected via a sealing liquid container 12 to a pneumatic tire 14 to be sealed or pumped up. According to the representation, the sealing liquid container 12 is directly coupled to the compressed-air providing system 10. Alternatively, the sealing liquid container 12 can also be connected to the compressed-air providing system 10 via a further connecting element (not shown). In systems according to the embodiment shown, compressed air for introducing sealing liquid, along with additional compressed air for distributing the sealing liquid in the pneumatic tire, is provided by the compressed-air providing system 10, wherein the compressed air is conducted through the sealing liquid container 12.

Alternatively, the compressed-air providing system 10 can also be connected directly to the pneumatic tire 14 to be pumped up.

Figure 2:
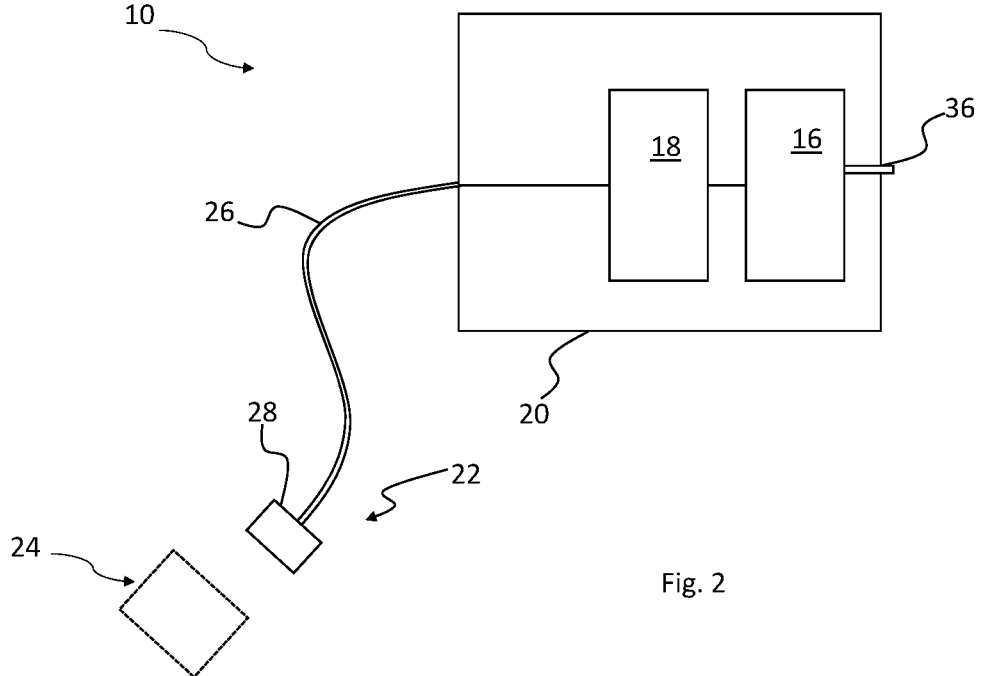
FIG. 2 shows a schematic representation of a compressed-air providing system according to the invention.

The compressed-air providing system 10 is explained below with reference to FIGS. 2 to 4.

The compressed-air providing system 10 comprises a compressor 16 and an electric motor 18, in particular for driving a compressing unit of the compressor 16. According to the embodiment shown, the compressor 16 and the electric motor 18 are received in a housing 20 of the compressed-air providing system 10.

Furthermore, the compressed-air providing system 10 comprises a means 22 for connecting the compressed-air providing system 10, in particular the electric motor 18, to an energy supply source 24 for supplying the compressed-air providing system 10, in particular the electric motor 18, with electrical energy.

The means 22 of the compressed-air providing system 10 is designed as a means 22 for wireless transmission of energy.

The energy supply source 24 accordingly likewise comprises means for wireless transmission of energy. Such interfaces are usually installed in motor vehicles for the purpose of charging smartphones.

The means 22 for wireless transmission of energy comprises a supply plate 28 or a supply pad. A supply plate 28 or supply pad is understood to mean the part 28 of the compressed-air providing system 10 remote from the housing, which part can be connected or is connected via an energy supply line, in particular via a cable 26, to the compressor, in particular to the electric motor.

Figure 3:
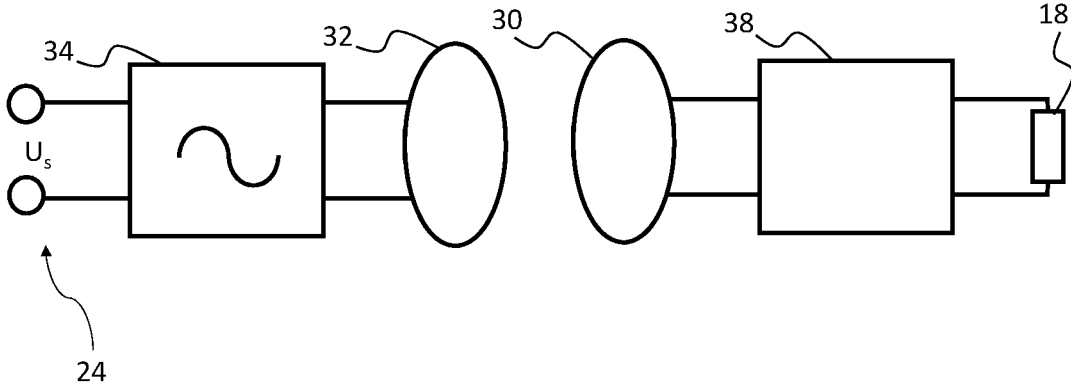
FIG. 3 shows a schematic representation of a compressed-air providing system according to the invention according to a further embodiment.
Figure 4:
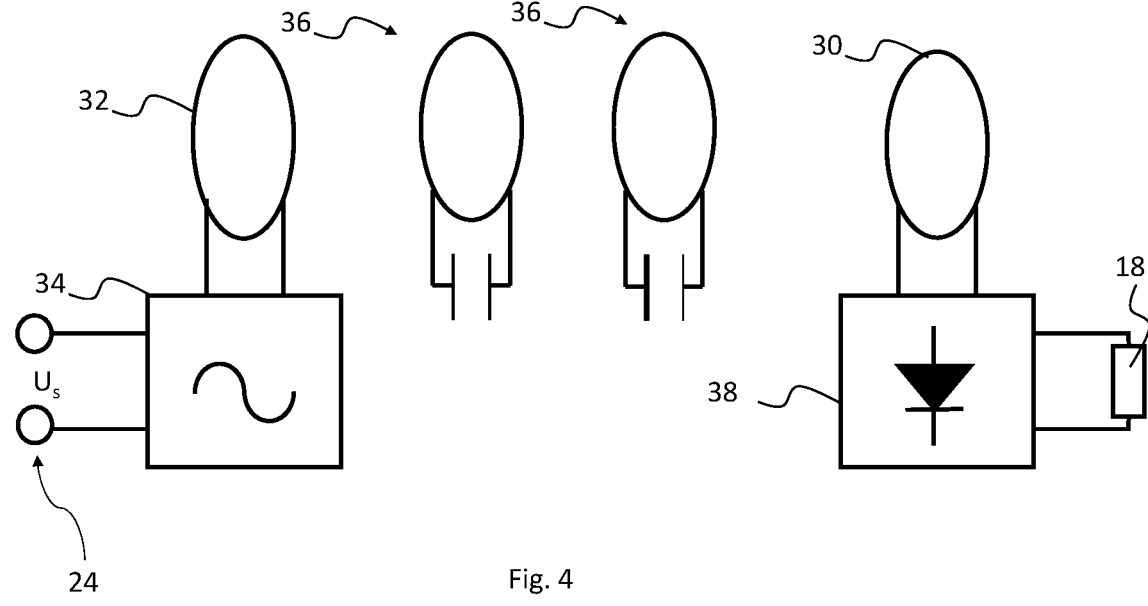
FIG. 4 shows a schematic representation of a compressed-air providing system according to the invention according to a further embodiment.

The means 22 for wireless transmission of energy comprises a receiver coil 30, see FIG. 3. A transmitter coil 32 is accordingly provided on the motor vehicle side. For inductive energy transmission, a magnetic alternating field is generated on the transmitter side, in particular by means of an oscillator 34. The transmission is effected by means of the mutual induction between the transmitter and receiver coil 30, 32. An alternating voltage is induced in the receiver coil 30. The distance between the two coils 30, 32 represents the wireless transmission path and should be as small as possible—typically a few centimeters to a few tens of cm distance.

In order to increase the range of the inductive coupling, according to a further advantageous embodiment it can be provided that the means for wireless transmission of energy comprises at least one resonant circuit 36. According to the embodiment shown, a resonant circuit is provided on both the transmitter side and receiver side. An oscillating circuit consists of a capacitor and a coil whose resonant frequency is matched to the transmission frequency. The resonance between the oscillating circuits 36 leads to improved magnetic coupling between the transmitter and receiver coil 30, 32 at the transmission frequency.

On the receiver side, an electrical circuit 38 for coupling the electric motor 18 to the receiver coil 30 is also provided.

The electrical circuit 38 comprises, for example, a converter or a rectifier. For example, the induced alternating voltage can thus advantageously be adapted to an operating voltage of the electric motor 18.

The invention claimed is:

1. A compressed-air providing system for providing air for tires of a motor vehicle, wherein the compressed-air providing system can be connected to a pneumatic tire to be sealed and/or pumped up, the system comprising a compressor having an electric motor for driving a compressing unit of the compressor, wherein the compressed-air providing system is provided with means for connecting the electric motor, to an energy supply source for supplying the electric motor with electrical energy, wherein the electrical energy is transmitted directly to the electric motor by the means, wherein the means comprises means for wireless transmission of energy, characterized in that the means is arranged outside of a housing of the compressed-air providing system, the housing receives the compressor and the electric motor, wherein the means can be connected or is connected via an energy supply line, in particular a cable to the electric motor, wherein the means includes at least one resonant circuit.

2. The compressed-air providing system according to claim 1, characterized in that the means comprises a receiver coil.

3. The compressed-air providing system according to claim 2, characterized in that the means comprises at least one electrical circuit for coupling the electric motor to the receiver coil.

4. The compressed-air providing system according to claim 3, characterized in that the electrical circuit comprises a converter.

5. The compressed-air providing system according to claim 1, characterized in that the means is integrated into a supply plate.

6. The compressed-air providing system according to claim 1, characterized in that the compressed-air providing system comprises a compressed-air outlet opening, wherein the compressed-air outlet opening can be connected directly or via a sealing liquid container to a pneumatic tire to be sealed and/or pumped up.

7. The compressed-air providing system according to claim 1 characterized in that the means is integrated into a supply pad.

8. The compressed-air providing system according to claim 1 characterized in that the means is integrated into a supply plate and a supply pad.

9. The compressed-air providing system according to claim 1 characterized in that the means includes a supply plate.

10. The compressed-air providing system according to claim 1 characterized in that the means includes a supply pad.

11. The compressed-air providing system according to claim 1 characterized in that the means includes a supply plate and a supply pad.

12. The compressed-air providing system according to claim 3, characterized in that the electrical circuit comprises a rectifier.

* * * * *